(12) United States Patent
Hartog

(10) Patent No.: US 7,284,903 B2
(45) Date of Patent: Oct. 23, 2007

(54) DISTRIBUTED OPTICAL FIBRE MEASUREMENTS

(75) Inventor: Arthur H. Hartog, Southampton (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 123 days.

(21) Appl. No.: 10/554,116

(22) PCT Filed: Mar. 31, 2005

(86) PCT No.: PCT/GB2004/001355

§ 371 (c)(1),
(2), (4) Date: Oct. 21, 2005

(87) PCT Pub. No.: WO2004/094972

PCT Pub. Date: Nov. 4, 2004

(65) Prior Publication Data

US 2006/0245468 A1 Nov. 2, 2006

(30) Foreign Application Priority Data

Apr. 24, 2003 (GB) ................................. 0309347.3

(51) Int. Cl.
*G01J 5/00* (2006.01)
*G01N 21/00* (2006.01)
(52) U.S. Cl. .................... 374/130; 356/73.1; 356/337; 356/342
(58) Field of Classification Search ................ 374/130, 374/131; 356/73.1, 337, 342
See application file for complete search history.

(56) References Cited

U.S. PATENT DOCUMENTS

| | | | | |
|---|---|---|---|---|
| 5,217,306 A | * | 6/1993 | Wada | .......................... 374/161 |
| 5,449,233 A | * | 9/1995 | Sai et al. | ..................... 374/161 |
| 5,765,948 A | * | 6/1998 | Sai | .............................. 374/161 |
| 2003/0021528 A1 | * | 1/2003 | Fredin et al. | .................. 385/31 |
| 2006/0210269 A1 | * | 9/2006 | Farhadiroushan et al. | ..... 398/48 |

* cited by examiner

*Primary Examiner*—Diego Gutierrez
*Assistant Examiner*—Megann E Vaughn
(74) *Attorney, Agent, or Firm*—Dan Hu; Bryan P. Galloway; Tim Curington

(57) ABSTRACT

A method of obtaining a distributed measurement comprises deploying an optical fibre in a measurement region of interest, and launching into it a first optical signal at a first wavelength $\lambda_0$ and a high power level, a second optical signal at a second wavelength $\lambda_{-1}$, and a third optical signal at the first wavelength $\lambda_0$ and a low power level. These optical signals generate backscattered light at the second wavelength $\lambda_{-1}$ arising from Raman scattering of the first optical signal which is indicative of a parameter to be measured, at the first wavelength $\lambda_0$ arising from Rayleigh scattering of the first optical signal, at the second wavelength $\lambda_{-1}$ arising from Rayleigh scattering of the second optical signal, and at the first wavelength $\lambda_0$ arising from Rayleigh scattering of the third optical signal. The backscattered light is detected to generate four output signals, and a final output signal is derived by normalising the Raman scattering signal to a function derived from the three Rayleigh scattering signals, which removes the effects of wavelength-dependent and nonlinear loss.

33 Claims, 7 Drawing Sheets

DISTRIBUTED OPTICAL FIBRE MEASUREMENTS

BACKGROUND OF THE INVENTION

The present invention relates to methods of obtaining distributed measurements using optical fibres, and apparatus therefor.

Techniques for using optical fibres to obtain distributed measurements of various parameters, such as optical time domain reflectometry and distributed temperature sensing, are well known. The underlying principle of these techniques is that light is injected into an end of the fibre, and undergoes scattering at all points along the length of the fibre. The amount and/or wavelength of the scattered light is affected by various parameters, such as temperature. Some of this light is backscattered to the fibre end, and the time at which it arrives at the fibre end is related to the position along the fibre at which it was scattered, owing to the constant speed of light within the fibre. Thus, detection of the backscattered light over time gives a representative profile of the parameter of interest over the length of the fibre.

Temperature can be detected by looking at backscattered light arising from the inelastic scattering process known as Raman scattering. This produces a pair of spectral bands shifted one to either side of the wavelength of the original injected light. The longer wavelength band is referred to as the Stokes component, and the shorter wavelength band as the anti-Stokes component. The amplitude of these components is temperature-dependent, so a distributed fibre system arranged to detect one or both of these components can be used as a temperature sensor [1].

Two arrangements may be considered for obtaining a temperature measurement. In either case, the anti-Stokes component is measured. This can be compared with either the Stokes component, or with backscattered light that has undergone elastic scattering (Rayleigh scattering) and hence has the original wavelength. In each situation, though, light at two different wavelengths is detected.

Light propagating in optical fibres experiences loss; this can vary with wavelength. This presents a problem in distributed temperature sensing (and other sensor arrangements that detect more than one wavelength), because the two detected components may undergo different amounts of loss in propagating from the scattering site to the fibre end. Thus a ratio obtained by comparing the two detected components is dependent not only on the amount of Raman scattering (the desired information), but also on the difference in loss suffered by the backscattered light on its return to the fibre end. The ratio can thus be distorted, giving an inaccurate measurement.

Unfortunately, it is very difficult to determine this differential loss and thus separate the effects of propagation loss from those of the temperature profile being measured.

One approach that has been taken to address this issue is to allow an estimate of the loss to be entered into the measurement system. However, such estimates tend to assume that the loss is constant or piece-wise constant along the fibre length. This is typically untrue, owing to nonuniformities in the fibre, such as bends and splices. Also, no account is taken of changes which may occur over time as the fibre degrades.

A more successful technique is to use a double-ended measurement method, in which the measurement is repeated from the other end of the fibre [2]. The additional information conveyed by the second measurement is sufficient to allow the effects of temperature to be separated from those of differential loss, because the temperature tends to appear the same regardless of the measurement direction, whereas the loss appears in an opposite sense which viewed from the other fibre end.

However, double-ended systems have a major disadvantage over single ended systems in which all measurements are made at only one end of the fibre, in that severe restrictions are imposed on installation of the fibre at the measurement region of interest. Instrumentation is required at both ends of the fibre, which is more costly and complex. In circumstances where the remote end of the fibre is inaccessible, it is necessary to install the fibre as a loop, so that both ends are in the same location. This can be awkward to achieve, and also doubles the length of the fibre required in situations where no additional information can be gleaned from the return part of the fibre, thus increasing overall propagation losses.

A further consideration is that of the maximum power that can be launched into the fibre. Ideally, a large amount of power should be launched, to give large return signals. This increases accuracy by improving the signal to noise ratio, and also reduces measurement times. However, in the case where the anti-Stokes signal is compared to the Stokes signal, high powers can distort the ratio by causing unwanted nonlinear effects. At low powers, the Raman scattering is spontaneous. If the injected optical power exceeds a particular threshold, however, stimulated Raman scattering will occur to a degree which depends on the incident light intensity. The stimulated scattering is nonlinear and converts power from the incident light to the Stokes component and hence alters the Stokes/anti-Stokes ratio. To avoid this it is therefore necessary to operate at a power level at which stimulated scattering converts no more than an acceptable fraction of the light.

A technique which addresses both the differential loss problem and the stimulated Raman scattering problem has been proposed [3]. The nonlinear effects are addressed by measuring the anti-Stokes light and the Rayleigh light to obtain the desired ratio signal. The Stokes component is not considered, so cannot distort the output. A first optical source is used to generate the light to give these two signals. In addition, a second optical source is provided which emits at the anti-Stokes wavelength of the first source, and a Rayleigh measurement is obtained at this wavelength. Thus three signals are measured, with the Rayleigh measurements being independent of the temperature but including the loss at the two wavelengths. To obtain a final output which is independent of any differential loss at the two wavelengths, the Raman measurement is normalised to the geometric mean of the two Rayleigh measurements.

However, this method does not entirely account for nonlinear distortion, although it is more robust than the Raman anti-Stokes/Stokes ratio method. If the threshold for stimulated Raman scattering is exceeded, not only is the Stokes component distorted, but the original injected light is depleted by the power transfer to the Stokes wavelength. This reduces the amount of light undergoing Rayleigh scattering, so that the detected Rayleigh signal is reduced, which in turn distorts the measured temperature profile.

As mentioned above, the nonlinear effects can be avoided by operating at low optical power levels, but this is not desirable. In particular, the low power reduces the maximum length of fibre that can be used before the total fibre loss becomes too high.

Therefore, there is a need for an improved distributed sensing method.

SUMMARY OF THE INVENTION

Accordingly, a first aspect of the present invention is directed to a method of using an optical fibre to obtain a distributed measurement of a parameter of interest, comprising: deploying an optical fibre in a measurement region of interest; launching a first optical signal at a first wavelength $\lambda_0$ and a first optical power level into the optical fibre; detecting backscattered light emitted from the optical fibre at a second wavelength $\lambda_{-1}$ arising from inelastic scattering of the first optical signal, and generating a first output signal therefrom, the first output signal being indicative of the parameter of interest; detecting backscattered light emitted from the optical fibre at the first wavelength $\lambda_0$ arising from elastic scattering of the first optical signal, and generating a second output signal therefrom; launching a second optical signal at the second wavelength $\lambda_{-1}$ into the optical fibre; detecting backscattered light emitted from the optical fibre at the second wavelength $\lambda_{-1}$ arising from elastic scattering of the second optical signal, and generating a third output signal therefrom; launching a third optical signal at the first wavelength $\lambda_0$ and a second optical power level less than the first optical power level into the optical fibre; detecting backscattered light emitted from the optical fibre at the first wavelength $\lambda_0$ arising from elastic scattering of the third optical signal, and generating a fourth output signal therefrom; generating a synthetic output signal from the second output signal and the fourth output signal; and generating a final output signal indicative of the parameter of interest by normalising the first output signal to the geometric mean of the synthetic output signal and the third output signal.

The measurement and use of a fourth, low power, output signal corresponding to elastic (Rayleigh) scattering of light at the first wavelength allows any nonlinear distortion of the first and second output signals to be compensated for, so that it does not distort the measurement. The second output signal, representing Rayleigh scattering at the first wavelength, may typically be obtained at a relatively high power level. This can lead to unwanted nonlinear effects, in particular stimulated Raman scattering, that convert power away from the first wavelength. Obtaining two Rayleigh scattering signals at the first wavelength, one at low power and one at high power, enables the effect of any nonlinearity to be discounted, because the low power signal should be free from any nonlinear distortion. Thus the accuracy of the measurement is improved.

Also, the addition of a fourth output signal should not greatly increase the measurement time compared to prior art methods. The Rayleigh scattering process is about a thousand times more efficient than inelastic scattering processes such as anti-Stokes Raman scattering, so even allowing for the reduced power used to obtain the fourth signal, the time required to obtain it can be a minor part of the overall time taken to perform the method.

Furthermore, the invention provides a method that utilises a single-ended fibre sensor arrangement. This avoids the problems commonly associated with double-ended configurations, such as the difficulties of installing fibre in a loop, the additional fibre length required and the associated increased loss, and the additional components needed to provide sources and detectors for each end of the fibre, or switching between the two ends.

Preferably, the second optical power level is selected to be below a threshold for nonlinear optical interactions of light at the first wavelength $\lambda_0$ propagating in the optical fibre. This ensures that the fourth output signal is free from nonlinear distortion, so that it can successfully be used to isolate any parts of the second output signal that are due to the nonlinear losses which need to be taken into account for accurate measurement results.

Advantageously, the synthetic output signal is generated by normalising the square of the second output signal to the fourth output signal.

In one embodiment, the inelastic scattering is Raman scattering, and the second wavelength $\lambda_{-1}$ is an anti-Stokes band of the first wavelength $\lambda_0$. Raman scattering is sensitive to various parameters of interest, and the resulting Stokes and anti-Stokes wavelength bands are widely spaced from the original generating wavelength so that the various output signals can be readily separated from one another. For example, Raman scattering is sensitive to temperature, so the parameter of interest may be temperature.

The method may further comprise matching spectral features of the inelastically backscattered light at the second wavelength $\lambda_{-1}$ to spectral features of the second optical signal. The inelastically backscattered light may have a substantially different spectrum from the second optical signal, since they originate from different sources even though their centre wavelengths may be similar. However, the accuracy of the measurement can be enhanced if this difference is removed or reduced by matching the spectra. For example, the inelastically backscattered light at the second wavelength $\lambda_{-1}$ may be spectrally filtered before the first output signal is generated. This accounts for situations in which the inelastic scattering process produces a very broad spectrum, as is the case for Raman scattering. Alternatively, the second optical signal may be spectrally broadened before it is launched into the optical fibre. Yet another approach is to vary the wavelength of the second optical signal (for example by altering the temperature of the source in a pre-determined way) so that the time-averaged spectrum of that signal measured over the acquisition period is closer to that of the first signal.

According to a further embodiment, the method may further comprise passing the backscattered light emitted from the optical fibre through a mode filter to remove higher order modes. The various wavelengths of interest may propagate in the fibre in different combinations of modes. The modes may be subject to different attenuation, particularly at fibre splices and connectors but also in the ordinary course of propagation in the sensing fibre. This is most pronounced for higher order modes, so removal of these gives outputs that have more closely aligned loss characteristics. Thus a source of differential loss between the signals is eliminated or reduced so that the accuracy of the measurements is improved. The optical fibre has a first core diameter and a first numerical aperture, so the mode filter may comprise an optical fibre having a second core diameter smaller than the first core diameter and a second numerical aperture smaller than the first numerical aperture. Alternatively, bulk optical devices may be used, so that the mode filter may comprise a spatial filter arranged to attenuate the higher order modes.

The optical fibre may have a core region comprising silica doped with germanium. This composition gives a balanced relationship between the elastic and inelastic scattering processes, in that a relative change in the composition of the core along the fibre or between fibre sections has a similar effect on the Raman and Rayleigh components of the scattered spectrum. As a result the measurements, which relies on the ratio of the Raman to Rayleigh scattering coefficients, is relatively unaffected in its accuracy by longitudinal changes in the dopant concentration. Further dopants can have a detrimental effect on the relationship, because they vary the Rayleigh scattering coefficient more significantly than that of the Raman scattering at those frequency shifts where the silica and germania Raman spectra overlap, so preferably the optical fibre has a core region comprising silica doped only with germanium, and no other dopants.

In one embodiment, the optical fibre is deployed within a well bore of an oil well. Optical fibres are commonly used as sensors in the oil industry, in which many parameters need to be measured and monitored, so the improvements provided by the present invention offer a valuable enhancement to the management of oil production.

Advantageously, the method may further comprise generating one or both of the first optical signal and the third optical signal by taking an optical signal at the second wavelength $\lambda_{-1}$ from an optical source operable to generate the second optical signal, and passing the optical signal at the second wavelength $\lambda_{-1}$ through a Raman shifting optical fibre so as to generate light at the first wavelength $\lambda_0$ by the process of stimulated Raman scattering within the Raman shifting optical fibre. This ensures that the optical signals at the first and second wavelengths have the correct wavelength spacing; this can in some cases be difficult to achieve using separate optical sources. The apparatus required to perform the method using the Raman shifting approach can also be less costly, more compact and more stable.

A second aspect of the present invention is directed to apparatus for obtaining a distributed measurement of a parameter of interest, comprising: an optical fibre for deployment in a measurement region of interest; one or more optical sources operable to generate and launch into the optical fibre: a first optical signal at a first wavelength $\lambda_0$ and a first optical power level; a second optical signal at a second wavelength $\lambda_{-1}$; and a third optical signal at the first wavelength $\lambda_0$ and a second optical power level less than the first optical power level; and one or more detectors operable to: detect backscattered light emitted from the optical fibre at the second wavelength $\lambda_{-1}$ arising from inelastic scattering of the first optical signal, and to generate a first output signal therefrom, the first output signal being indicative of the parameter of interest; detect backscattered light emitted from the optical fibre at the first wavelength $\lambda_0$ arising from elastic scattering of the first optical signal, and to generate a second output signal therefrom; detect backscattered light emitted from the optical fibre at the second wavelength $\lambda_{-1}$ arising from elastic scattering of the second optical signal, and to generate a third output signal therefrom; and detect backscattered light emitted from the optical fibre at the first wavelength $\lambda_0$ arising from elastic scattering of the third optical signal, and to generate a fourth output signal therefrom; and a signal processor operable to generate a synthetic output signal from the second output signal and the fourth output signal and to generate a final output signal indicative of the parameter of interest by normalising the first output signal to the geometric mean of the synthetic output signal and the third output signal.

Preferably, the one or more optical sources comprises a single optical source operable to generate the first optical signal and the third optical signal, the single optical source comprising a power control operable to alter the optical power level of an optical signal generated by the single optical source between the first optical power level and the second optical power level. This provides a simpler apparatus with fewer components.

Further, the one or more optical sources may comprise an optical source operable to generate the second optical signal, and one or more Raman shifting optical fibres arranged to receive an optical signal at the second wavelength $\lambda_{-1}$ from the optical source operable to generate the second optical signal and to generate the first optical signal and the third optical signal by the process of stimulated Raman scattering within the Raman shifting optical fibre.

The second optical power level may be selected to be below a threshold for nonlinear optical interactions of light at the first wavelength $\lambda_0$ propagating in the optical fibre.

The processor may be operable to generate the synthetic output signal by normalising the square of the second output signal to the fourth output signal.

In some embodiments, the inelastic scattering is Raman scattering and the second wavelength $\lambda_{-1}$ is an anti-Stokes band of the first wavelength $\lambda_0$. The parameter of interest may be temperature.

The apparatus may further comprise a spectral modifier operable to match spectral features of the inelastically backscattered light at the second wavelength $\lambda_{-1}$ to spectral features of the second optical signal. The spectral modifier may comprise one or more spectral filters through which the inelastically scattered light at the second wavelength $\lambda_{-1}$ is passed before the first output signal is generated. Alternatively or additionally, the spectral modifier may comprise a spectral broadening arrangement operable to spectrally broaden the second optical signal before it is launched into the optical fibre. The spectral modifier for example by operable to vary the wavelength of the second optical signal by altering the temperature of the source in a pre-determined way so that the time-averaged spectrum of that signal measured over the acquisition period is closer to that of the first signal.

Further, the apparatus may comprise a mode filter operable to remove higher order modes from the backscattered light emitted from the optical fibre. The optical fibre has a first core diameter and a first numerical aperture, so the mode filter may comprise an optical fibre arranged to receive the backscattered light emitted from the optical fibre and comprising an optical fibre having a second core diameter smaller than the first core diameter and a second numerical aperture smaller than the first numerical aperture. Alternatively, the mode filter may comprise a spatial filter arranged to attenuate the higher order modes.

Preferably, the optical fibre has a core region comprising silica doped with germanium and still more preferably, the core region comprises silica doped only with germanium.

In an advantageous embodiment, the optical fibre is for deployment within a well bore of an oil well. The apparatus may then further comprise a fibre deployment mechanism operable to deploy the optical fibre into the well bore.

In one embodiment, the apparatus may further comprise a switch switchable between: a first configuration in which the switch connects the optical fibre to the one or more optical sources so that the first optical signal and the third optical signal are launched into the optical fibre, and to the one or more detectors so that the one or more detectors detect backscattered light arising from inelastic scattering of the first optical signal, backscattered light arising from elastic scattering of the first optical signal, and backscattered light arising from elastic scattering of the third optical signal; and a second configuration in which the switch connects the optical fibre to the one or more optical sources so that the second optical signal is launched into the optical fibre, and to the one or more detectors so that the one or more detectors detect backscattered light arising from elastic scattering of the second optical signal. This arrangement is a convenient way of providing separate detectors for the two types of backscattered light at the second wavelength. The detectors can be then be individually optimised for the detection task they are required to perform, having regard to parameters such as sensitivity and bandwidth.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
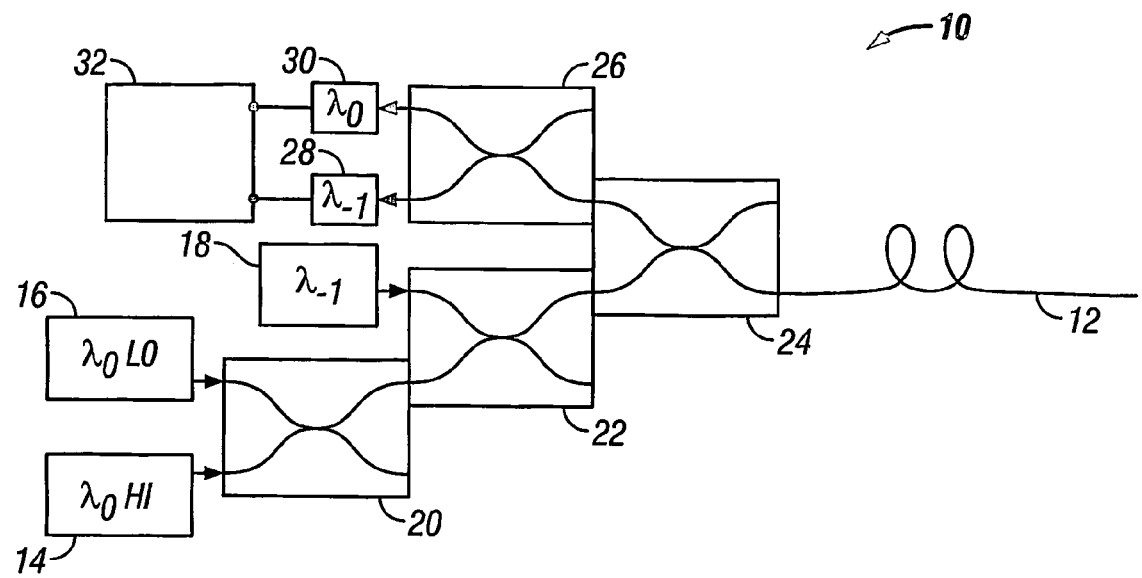
FIG. 1 shows a schematic representation of a first example of apparatus according to a first embodiment of the present invention.

The present invention proposes a modification to a known technique for obtaining distributed optical fibre measurements [3], by measuring an additional signal and using this to compensate the known measurements. This approach allows both loss and nonlinear distortion to be accounted for in the final measurement, so that the accuracy of the measurement is improved.

The prior art technique uses two optical sources and corresponding detectors to obtain three signals from an optical fibre deployed in a measurement region of interest. The parameter of interest to be measured may, for example, be temperature. In this case, the optical sources are configured to provide optical outputs at different wavelengths, these being a fundamental probe wavelength $\lambda_0$ and the anti-Stokes wavelength $\lambda_{-1}$ produced by Raman scattering of $\lambda_0$ in the particular material of which the fibre is made. An optical signal in the form of a pulse of light at $\lambda_0$ is launched into the fibre, and produces backscattered light at the anti-Stokes wavelength $\lambda_{-1}$ via inelastic Raman scattering and also backscattered light at $\lambda_0$ via elastic Rayleigh scattering. This light is measured to give two output signals, one that is independent of temperature (the Rayleigh scattering) and one which is dependent on temperature and can hence be used as a measurement of the temperature distribution along the fibre (the Raman scattering). Both measurements are affected by loss, which may not be the same for each owing to the transmission properties of the fibre, which are typically wavelength dependent.

Also, a further optical signal is launched in the fibre, as a pulse at wavelength $\lambda_{-1}$. This produces its own Rayleigh backscattering at $\lambda_{-1}$, which is detected to give a third output signal. This is also independent of temperature, but dependent on the fibre loss at $\lambda_{-1}$.

The geometric mean of the two Rayleigh signals is then calculated. This gives a synthetic Rayleigh signal that has a mixture of the properties of the fibre loss, or attenuation, at both the probe wavelength $\lambda_0$ and the anti-Stokes wavelength $\lambda_{-1}$. In this way, a signal is obtained that replicates the overall loss experienced by the Raman signal, which has the probe wavelength $\lambda_0$ on its outward journey to the scattering site, and the anti-Stokes wavelength $\lambda_{-1}$ on its return journey, after backscattering. Finally, to give a temperature profile that is independent of any difference in loss at the two wavelengths, the Raman signal is normalised to the synthetic Rayleigh signal.

Theory

To explain the method in more detail, a mathematical analysis is now given, concluding with the modification according to the present invention.

In the following, the anti-Stokes signal is denoted by the subscript TTS, from "temperature sensitive"; the Rayleigh signal at the probe wavelength $\lambda_0$ is denoted by the subscript NTSA, from "non-temperature sensitive, optical source A"; and the Rayleigh signal at the anti-Stokes wavelength $\lambda_{-1}$ is denoted by the subscript NTSB, from "non-temperature sensitive, optical source B".

The three signals $P_{TTS}$, $P_{NTSA}$ and $P_{NTSB}$ obtained from the detected backscattered light can be defined as:

$$P_{as}(z) = \frac{1}{2} P_0 W K_{tts} \frac{c}{Ng_{as}} \alpha_{stts}(z) S_{tts}(z) \exp\left[\int_0^z -\alpha(\alpha_{Ray0o}(u) + \alpha_{btts}(u)) du\right]$$

$$P_{NTSA}(z) = \frac{1}{2} P_0 W K_0 \frac{c}{Ng_0} \alpha_{s0}(z) S_0(z) \exp\left[\int_0^z -\alpha(\alpha_{Ray0o}(u) + \alpha_{Ray0b}(u)) du\right]$$

$$P_{NTSB}(z) = \frac{1}{2} P_{as} W K_{as} \frac{c}{Ng_{as}} \alpha_{sas}(z) S_0(z) \exp\left[\int_0^z -\alpha(\alpha_{aso}(u) + \alpha_{asb}(u)) du\right]$$

where z is distance along the fibre;

Ng is the group index at the relevant wavelength;

c is the velocity of light in a vacuum;

$\alpha_s$ is the scattering loss;

S is the capture fraction, which is that portion of the scattered light that is captured within the numerical aperture of the fibre in the return direction and hence backscattered;

P is the power in the incident light pulse;

W is the pulse duration; and

K is a constant that takes account of system design aspects, such as the transmission of filters and sensitivity of detectors.

The subscript "Ray0" refers to loss at the probe wavelength $\lambda_0$, and the "o" and "b" suffices refer respectively to the outward and backward propagation directions. The subscript "as" refers to loss at the anti-Stokes wavelength $\lambda_{-1}$. The "btts" subscript refers specifically to the losses seen by the anti-Stokes signal on its return from the scattering site.

This may possibly differ from the loss for that wavelength in the backward propagation direction, $\alpha_{asb}$ (for example, owing to differences in spectral width). Hence the two different expressions are seen in the equations for the $\lambda_{-1}$ Raman signal and the $\lambda_{-1}$ Rayleigh signal. For the variables P, W and K, the subscript "0" refers to the wavelength $\lambda_0$, and the subscripts "as" and "tts" refer to the wavelength $\lambda_{-1}$ ("tts" being used specifically for Raman anti-Stokes backscatter).

As described above, the final output signal of interest is a normalised version of the Raman signal, normalised to the geometric mean of the Rayleigh signals. If this is designated by $\eta$, then $$\eta(z) = \frac{P_{as}(z)}{\sqrt{P_{NTSA}(z)P_{NTSB}(z)}}$$

or, substituting from above, $$\eta(z) = \frac{\alpha_{stts}(z)\exp\left[\int_0^z -\left(\frac{\alpha_{Ray0o}(u)}{2} - \frac{\alpha_{Ray0b}(u)}{2} + \alpha_{btts}(u) - \frac{\alpha_{aso}(u) + \alpha_{asb}(u)}{2}\right)du\right]}{\sqrt{\alpha_{s0}(z)\alpha_{sos}(z)}\frac{\sqrt{P_{as}W_{as}}}{\sqrt{P_0 W}}\frac{\sqrt{K_0 K_{as}}}{K_{tts}}\sqrt{\frac{Ng_{as}}{Ng_0}}\frac{\sqrt{S_0(z)S_{as}(z)}}{S_{tts}(z)}}$$

Thus, each of the factors in front of the integral sign is normalised, as follows:

the anti-Stokes Raman scattering coefficient, by the geometric mean of the Rayleigh scattering coefficient at the probe and anti-Stokes wavelengths.

the pulse energies PW, group indices Ng and constants K.

the capture fractions S, normalised by the geometric mean at the two wavelengths (alternative models may normalise at the anti-Stokes wavelength only).

Also, the term in the integral should be zero if the following two conditions are met:

the loss at the probe wavelength is the same in the outward direction as the return direction.

the loss seen by the backscattered anti-Stokes signal on its return to the launch end of the fibre is the same as the mean of the losses seen by the Rayleigh signals on the outward and return journeys.

It is also possible for the integrand to be zero if differences in the losses at the probe wavelength are exactly compensated by those at the anti-Stokes wavelength, although this is unlikely.

The above analysis assumes that the losses seen by the various signals are linear propagation losses only, depending on the characteristics of the fibre, not on the optical power level. However, in the case of the NTSA signal, which refers to the first two terms $\alpha_{Ray0o}(u)$ and $\alpha_{Ray0b}(u)$ in the integral, there is a specific potential problem with optical nonlinearity. It is desirable to always operate at a high pulse power, to maximise the backscattered signals. However, if the optical power threshold for the onset of nonlinear optical effects (specifically stimulated Raman scattering) is exceeded, the probe pulse at $\lambda_0$ will experience an artificially high loss, corresponding to propagation loss increased by nonlinear loss arising from the conversion of power from $\lambda_0$ to the Stokes wavelength at $\lambda_{+1}$. In contrast, the backscattered Rayleigh signal at $\lambda_0$ is at a much lower power and is therefore free from nonlinear effects. In these circumstances, therefore, $\alpha_{Ray0o}$ is liable to be greater than $\alpha_{Ray0b}$.

The present invention seeks to address this problem by providing a way of accounting for the nonlinearity-enhanced loss in the outward direction. Overall, to normalise the Raman signal, it is necessary to take into account all losses experienced, resulting from wavelength dependency and from nonlinear conversion. The Raman signal is obtained from outwardly propagating light at $\lambda_0$ that experiences nonlinear loss, followed by backwardly propagating light at $\lambda_{-1}$ that experiences no nonlinear loss, so to get a full picture of the loss, the mean of these should be obtained. The latter $\lambda_{-1}$ linear case is already represented by the NTSB signal. However, the NTSA signal provides a measure of the mean of the linear and nonlinear losses at $\lambda_0$, because it experiences nonlinear loss on the outward journey and linear loss on the return journey. Thus, if a measurement is made of light that has only been subject to linear loss, the contribution due to the outward nonlinear loss can be found.

This is achieved by repeating the NTSA measurement at a lower optical power, to avoid nonlinear effects. Thus, a fourth signal is obtained, from a measurement of the Rayleigh scattering at $\lambda_0$ performed at low optical power. If this is designated by the subscript NTSC (it is a Rayleigh signal so is non-temperature sensitive), then $$P_{NTSC}(z) = \frac{1}{2}P_{0c}WK_0\frac{c}{Ng_0}\alpha_{s0}(z)S_0(z)\exp\left[\int_0^z -(\alpha_{Ray0ol}(u) + \alpha_{Ray0b}(u))du\right]$$

In this expression, the loss term $\alpha_{Ray0ol}(u)$ represents the linear loss in the outward direction. This should be contrasted with the loss term $\alpha_{Ray0o}(u)$ in the expression for $P_{NTSA}$, which may or may not be linear, depending on the power level.

As the NTSA signal can be considered as the geometric mean of nonlinear and linear signals, and the linear signal is given by $P_{NTSC}$, it is possible to calculate a synthetic signal that accurately reflects the losses suffered by the probe signal at $\lambda_0$ when it generates the TTS signal. Using a D subscript, the synthetic signal is given by $$P_{NTSD}(z) = \frac{(P_{NTSA}(z))^2}{P_{NTSC}(z)}$$

which can be expressed as $$P_{NTSD}(z) = \frac{\left[\frac{1}{2}P_0 WK_0\frac{c}{Ng_0}\alpha_{s0}(z)S_0(z)\exp\left[\int_0^z -(\alpha_{Ray0o}(u) + \alpha_{Ray0b}(u))du\right]\right]^2}{\frac{1}{2}P_{0c}WK_0\frac{c}{Ng_0}\alpha_{s0}(z)S_0(z)\exp[\int_0^z -(\alpha_{Ray0ol}(u) + \alpha_{Ray0b}(u))du]}$$

which reduces to $$P_{NSTD}(z) = \frac{\frac{1}{2}(P_0 W)^2}{P_{0c}W_c}K_0\frac{c}{Ng_0}\alpha_{s0}(z)S_0(z)$$

$$\exp\left[\int_0^z -[2\alpha_{Ray0o}(u) - (\alpha_{Ray0ol}(u) + \alpha_{Ray0b}(u))]du\right]$$

Using $P_{NTSD}$ in place of $P_{NSTA}$ in the expression for $\eta$ hence takes into account the desired contribution from the possibly nonlinearly distorted outward probe pulse, thus $$\eta(z) = \frac{P_{as}(z)}{\sqrt{P_{NTSD}(z)P_{NTSB}(z)}}$$

or $$\eta(z) = \frac{P_{as}(z)}{\sqrt{\frac{(P_{NTSA}(z))^2}{P_{NTSC}(z)}P_{NTSB}(z)}}$$

which can be shown to be $$\eta(z) = \frac{\alpha_{stts}(z)\exp\left[\int_0^z -\left(\alpha_{btts}(u) - \frac{\alpha_{aso}(u)+\alpha_{asb}(u)}{2} - \frac{\alpha_{Ray0ol}(u) - \alpha_{Ray0b}(u)}{2}\right)du\right]}{\sqrt{\alpha_{s0}(z)\alpha_{sos}(z)}\frac{\sqrt{P_{as}W_{as}}}{\sqrt{\frac{(P_0W)^2}{P_{0c}W_c}}}\frac{\sqrt{K_0K_{as}}}{K_{tts}}\sqrt{\frac{Ng_{as}}{Ng_0}}\frac{\sqrt{S_0(z)S_{as}(z)}}{S_{tts}(z)}}$$

It can be seen from the above expression that the contribution to the loss from $\alpha_{Ray0o}(u)$, which has a nonlinear component, has been eliminated. Thus, by making a fourth measurement, any nonlinear distortion of the ratio of the Raman and Rayleigh signals caused by high pulse powers can be eliminated from the final result. Thus, the desirable high pulse powers can be used to give an improved signal to noise ratio and an increased measurement distance without any reduction in accuracy of the results.

FIRST EMBODIMENT

Apparatus may be configured in a number of ways to implement the present invention.

FIG. 1 shows a schematic representation of a first example of apparatus suitable for implementing the method of the present invention.

The apparatus 10 comprises a length of optical fibre 12 arranged to be deployed in a measurement region of interest, having an associated parameter of interest of a kind that affects the optical propagation characteristics of the fibre 12. The length of the optical fibre 12 is such that it extends at least over a distance within the measurement region which is of interest. The fibre 12 is arranged for single-ended operation, in that all associated equipment is positioned at one end of the fibre 12. This is advantageous because measurements can be made in environments and circumstances in which it is not possible or practical to access both ends of the fibre 12.

As discussed above in the theory section, measurements are made using a combination of four separate signals which are obtained from three separate optical signals launched into the fibre 112, each optical signal having different properties. Therefore, the apparatus 10 comprises three individual optical sources. The first of these optical sources 14 is operable to generate light at a wavelength $\lambda_0$. This wavelength can be selected as appropriate, for example, it may be a wavelength at which the optical fibre 12 has low absorption and low transmission loss, so that the light can propagate a long distance, giving scope for large fibre lengths to be used. Also, the first optical source 14 emits light at a power level that is close to or above the optical power threshold for the nonlinear effect of stimulated Raman scattering of the wavelength $\lambda_0$ in the material from which the fibre 12 is made. This is designated by the label "HI" in FIG. 1. The first optical source therefore emits a first optical signal at $\lambda_0$, which produces backscattered light within the fibre 12 both at the anti-Stokes wavelength $\lambda_{-1}$ (determined by $\lambda_0$ and the Raman spectrum of the fibre material) arising from inelastic Raman scattering, where $\lambda_{-1}$ is a shorter wavelength than $\lambda_0$, and also at $\lambda_0$, arising from elastic Rayleigh scattering.

A second optical source 18 is operable to generate light at the anti-Stokes wavelength $\lambda_{-1}$ of the first wavelength $\lambda_0$. When this propagates within the fibre 12, it produces Rayleigh scattered light at $\lambda_{-1}$.

A third optical source 16 is also operable to generate light at wavelength $\lambda_0$, but at a power level lower than that produced by the first optical source 14, and which is below the Raman threshold (designated by "LO" in FIG. 1). When launched into the fibre 12, light from the second optical source produces backscattered Rayleigh light at $\lambda_0$, which is free from any nonlinear distortion arising from the onset of stimulated Raman scattering.

In order to obtain time resolution of measurements made with the apparatus 10, the light from the three optical sources 14, 16, 18 is generated and launched into the fibre 12 in the form of optical pulses. If continuous wave radiation is used, it is not possible to accurately measure the time at which backscattered light is returned to the fibre end because backscatter from many points within the fibre will be received at the same time. This is addressed by using a pulse of light. The optical sources 14, 16, 18 may therefore be Q-switched lasers, for example. Alternatively, the time information can be obtained by using frequency modulated continuous wave inputs, in which the optical sources are modulated with a sinusoidal waveform, the frequency of which is varied, for example with a linear chirp. If the returned light signals are Fourier transformed, a waveform equivalent to that obtained in the time domain results. A further alternative is to use pseudo-randomly encoded pulse trains, and to perform a correlation operation between the launched code and the measured backscattered signals. Any of these approaches may be used with the present invention.

An arrangement of optical power combiners and power splitters is used to launch the outputs of the optical sources 14, 16, 18 into the end of the optical fibre 12 and also to receive and direct the backscattered light emitted from the fibre 12. A number of these devices are shown in FIG. 1, and in this example have the form of four-port fused fibre couplers. A first input coupler 20 receives the light pulses from the first and third optical sources 14, 16 into its two input ports, and emits the pulses from its two output ports. One of the output ports is coupled to an input port of a second input coupler 22. The other input port of the second input coupler 22 receives the pulses generated by the second optical source 18. Thus the outputs of all three optical sources 14, 16, 18 are transmitted to the output ports of the second input coupler 22. One of these output ports is then coupled to an input port of an input/output coupler 24. The optical fibre 12 is coupled to one of the output ports of the input/output coupler 24. In this way, pulses from each of the optical sources 14, 16, 18 can be launched into the fibre 12.

The returning backscattered light is emitted from the end of the fibre 12 and hence enters the input/output coupler 24. It is transmitted through the input/output coupler to the remaining input port (with respect to the launched pulse propagation direction). This port is coupled to an output coupler 26 configured to direct light at $\lambda_0$ only to one of its output ports and light at $\lambda_{-1}$ only to its other output port. It may be desirable to include a filter for each wavelength.

A pair of optical detectors 28, 30, such as photodiodes, are arranged at these output ports, and are operable to detect light at the respective wavelength emitted from the corresponding output port, and to generate an output signal corresponding to the amount of light detected with respect to time. This may be achieved by using two different types of detector, or two of the same type of detector if the spectral response is broad enough to include both $\lambda_0$ and $\lambda_{-1}$.

A first detector 28 is operable to detect $\lambda_{-1}$. It therefore detects the Raman scattered light at $\lambda_{-1}$ generated by a first, high power, optical signal at $\lambda_0$ emitted by the first optical source 14, and produces a first output signal therefrom. It further detects Rayleigh scattered light at $\lambda_{-1}$ originating from a second optical signal at $\lambda_{-1}$ emitted by the second optical source 18, and produces a third output signal therefrom.

A second detector 30 is operable to detect $\lambda_0$. It therefore detects Rayleigh scattered light at $\lambda_0$ produced from the first optical signal, and produces a corresponding second output signal. It also detects Rayleigh scattered light at $\lambda_0$ originating from a third, low power, optical signal at $\lambda_0$ emitted by the third optical source 16, and produces a corresponding fourth output signal.

The four output signals generated by the detectors 28, 30 are passed to a processor 32, which may for example include a microprocessor with suitable software, or a hardware configuration such as an electronic circuit or some combination of these. The processor is operable to process the four output signals to give the result of interest, which is the Raman signal at $\lambda_{-1}$ suitably corrected or normalised by the Rayleigh signals to remove the effects of wavelength-dependent and nonlinear losses. Thus the processor 32 may usefully include one or more analog-to-digital converters to convert the measured output signals to a digital form for more convenient data processing.

Therefore, in accordance with the theory already presented, the processor is operable to generate a synthetic output signal from the second output signal and the fourth output signal. This is done by calculating the square of the second output signal, and then normalising the square to the fourth output signal. Thus, synthetic signal=(second signal)$^2$/fourth signal. Then, the geometric mean of the synthetic signal and the third signal is calculated, and used to normalise the first signal to give a final output signal, so that final output signal=first signal/$\sqrt{}$(synthetic signal×third signal). The final output signal may then be processed and/or stored as desired to give the desired measurement. For example, the signal may be processed to turn the time information contained therein to corresponding distance along the fibre 12.

Figure 2:
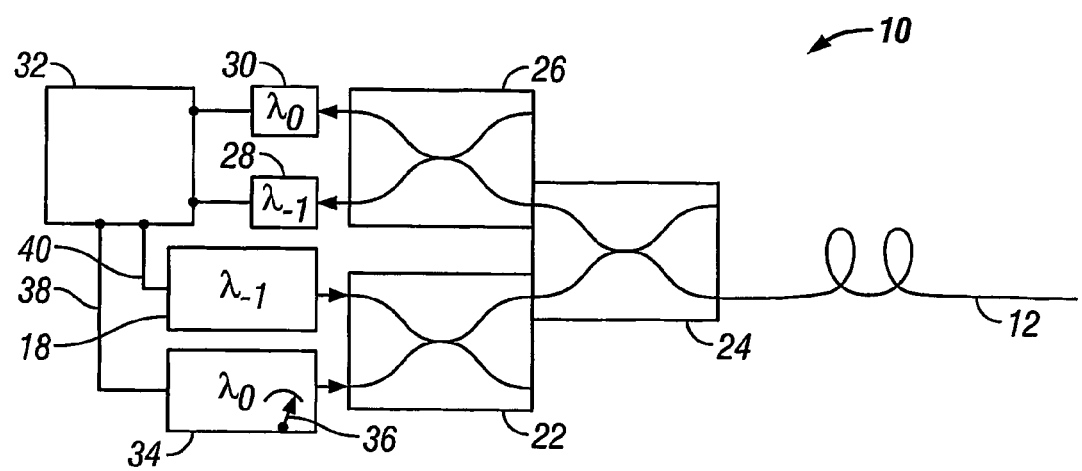
FIG. 2 shows a schematic representation of a second example of apparatus according to a first embodiment of the present invention.

FIG. 2 shows an alternative arrangement of the apparatus 10. In this case, the first and third optical sources 14, 16 are replaced by a single optical source 34 operable to generate light at $\lambda_0$ and further having a power control 36 to alter the optical power it generates between the high and low levels previously generated separately by the first and third optical sources 14, 16. This may be done in any suitable way, such as using a diode laser for the single optical source 34 and providing controls for altering its current supplies, or by providing a neutral density filter to be placed in the beam path to attenuate the light passing through it. The use of a single optical source 34 to generate the first and third optical signals reduces the total number of optical sources to two. This allows the first input coupler 20 to be dispensed with, because the two optical sources can be coupled to the two input ports of the second input coupler 22, as shown in FIG. 2.

Moreover, the power control 36, and indeed the single optical source itself 34 may be connected to the processor 32 by one or more control lines 38 so that the processor 32 can control the operation of single optical source 34 to generate pulses of light at the required time and the required power level. Similarly, the second optical source 18 can also be connected to the processor 32 by a control line 40 to enable to processor 18 to control the output of the second optical source 18. In this way, the measurement process can be made entirely automated.

Figure 3:
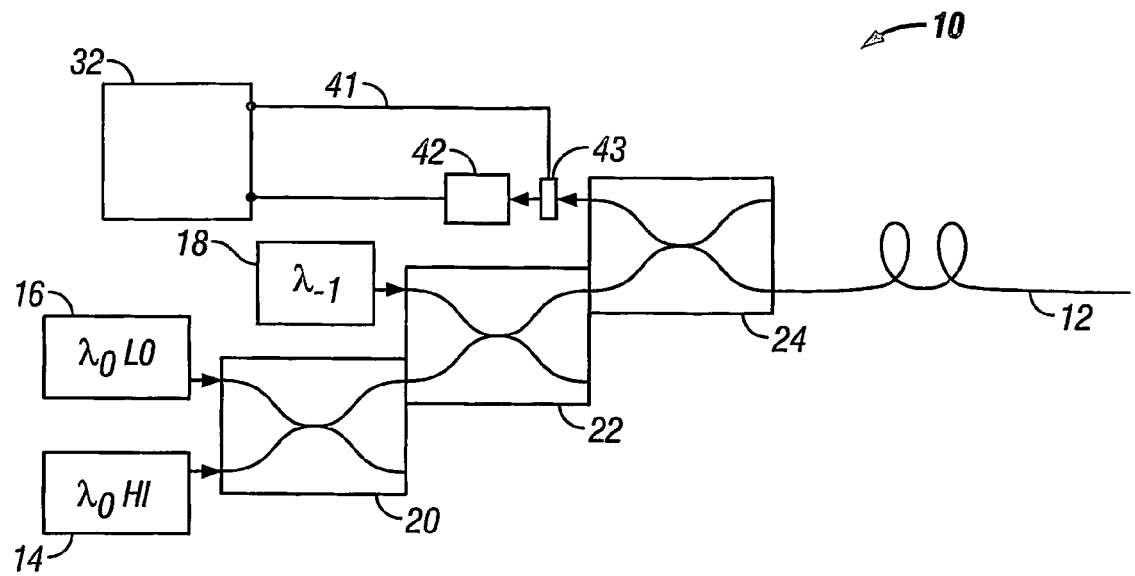
FIG. 3 shows a schematic representation of a third example of apparatus according to a first embodiment of the present invention.

FIG. 3 shows a third example of the apparatus 10. In this example, the two detectors 28, 30 are replaced by a single detector 42 capable of detecting both $\lambda_0$ and $\lambda_{-1}$. Thus, the detector 42 must have a sufficiently broad bandwidth. The output of the detector 42 is transmitted direct to the processor 32. The processor 32 may be operable to perform any spectral filtering necessary to separate the signals at $\lambda_0$ and $\lambda_{-1}$ one from another. Alternatively, one or more removable or switchable optical filters 43 can be arranged in front of the detector 42, and operated (i.e. moved in and out of the beam path or otherwise activated to select the appropriate wavelengths $\lambda_0$ and $\lambda_{-1}$ at appropriate times to obtain the various output signals sequentially). The filter or filters 41 can be linked to the controller 32 via a control line 41 so that they can be operated automatically. The example of FIG. 3 allows the output coupler 26 to be dispensed with, since there is no requirement to provide a splitting capability to distribute the backscattered outputs to two different detectors.

In any of these examples, the fused fibre couplers can be replaced by other types and/or arrangements of optical couplers that perform the desired coupling function, i.e. delivering the three optical signals to the optical fibre and delivering the backscattered output to the detector or detectors.

SECOND EMBODIMENT

The examples and embodiments presented thus far have used fused fibre couplers to direct the various light signals between the optical sources, the sensing fibre and the detectors. Couplers of this kind are particularly applicable to systems using single mode optical fibre, for which single mode fused couplers with the necessary wavelength-dependent power splitting and coupling capability are readily available. However, in the event that multimode optical fibre is used for the sensing fibre, an alternative approach may be adopted. Fused tapered fibre couplers are available for multimode fibre, but these devices tend to lack the required wavelength-dependent operation. Therefore, a multimode system may instead comprise bulk optic coupling and splitting arrangements to achieve the same result.

Figure 4:
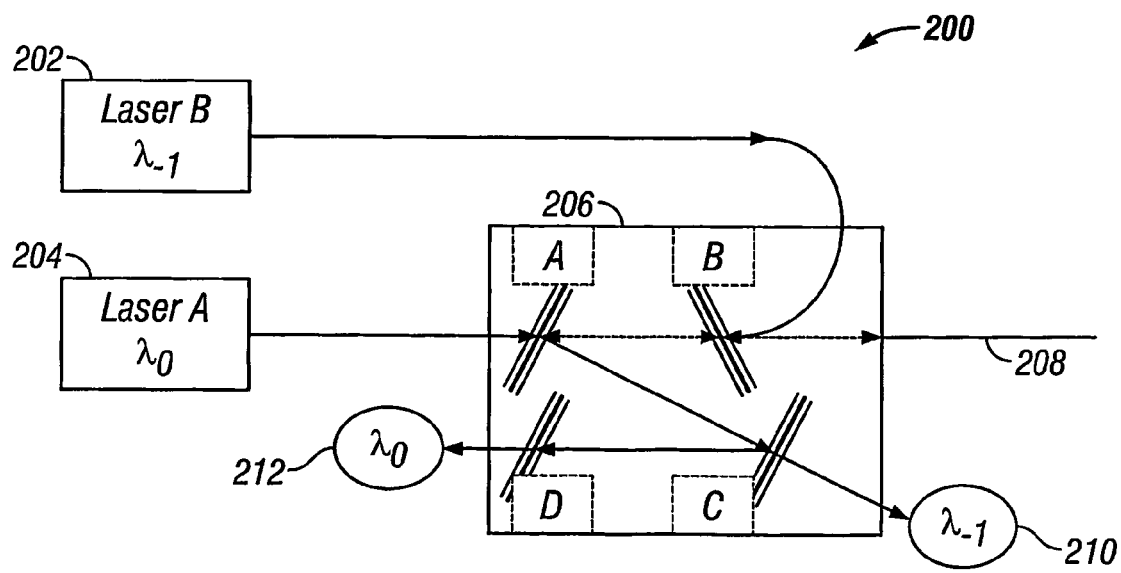
FIG. 4 shows a schematic representation of a first example of apparatus according to a second embodiment of the present invention.

FIG. 4 shows a schematic diagram of such a system. The apparatus 200 comprises a first optical source 202 operable to generate light at wavelength $\lambda_{-1}$ to form the second optical signal, and a second optical source 204 operable to generate light at wavelength $\lambda_0$ to form the first and third optical signals. In this example the second optical source is assumed to have variable power output to produce each of these signals, as described with respect to FIG. 2.

The various couplings and splittings of the input and output signals is performed by an optical block 206 arranged to receive the optical signals from the optical sources 202 and 204, couple the optical signals into the sensing fibre 208, receive backscattered light at $\lambda_0$ and $\lambda_{-1}$ and direct this light to one of two detectors 210, 212, the first of which is configured to detect light at $\lambda_{-1}$ and the second of which is configured to detect light at $\lambda_0$. As before, the detectors 210, 212 generate output signals and supply them to the processor (not shown).

The optical block 206 comprises four angled dichroic beamsplitters/mirrors A, B, C and D. Each has a particular reflectivity/transmissivity at the two wavelengths of interest, so that different beam paths are created through the optical block 206. Various lens (not shown) are typically required at the interfaces between optical fibres and the optical block 206, to give substantially collimated light within the optical block 206. The reflectivity characteristics of each beamsplitter are as shown in Table 1.

Using this arrangement of high and low reflectivity (the values may differ somewhat from those of Table 1), beam paths are formed as follows: The output from the first optical source 202, at $\lambda_{-1}$, enters the optical block so as to be incident on beamsplitter B. It is reflected therefrom, and directed into the sensing fibre 208. The output from the second optical source 204, as $\lambda_0$, enters the optical block 206 so as to pass through beamsplitter A, and then through beamsplitter B so that the beam path is coincident with that for light at $\lambda_{-1}$ from the first optical source 202, and the light at $\lambda_0$ is also coupled into the fibre 208. The returning backscattered light at both $\lambda_0$ and $\lambda_{-1}$ leaves the fibre 208 and enters the optical block 206, where it passes through beamsplitter B, and is reflected from beamsplitter A towards beamsplitter C. Beamsplitter C transmits light at $\lambda_{-1}$ out of the optical block 206 and onto the $\lambda_{-1}$ detector 210, and reflects light at $\lambda_0$ onto beamsplitter D. This final beamsplitter D then transmits light at $\lambda_0$ to the $\lambda_0$ detector 212, acting as a filter in the process to remove any residual light at $\lambda_{-1}$, or other wavelengths such as the Stokes band of $\lambda_0$, at $\lambda_{+1}$.

Figure 5:
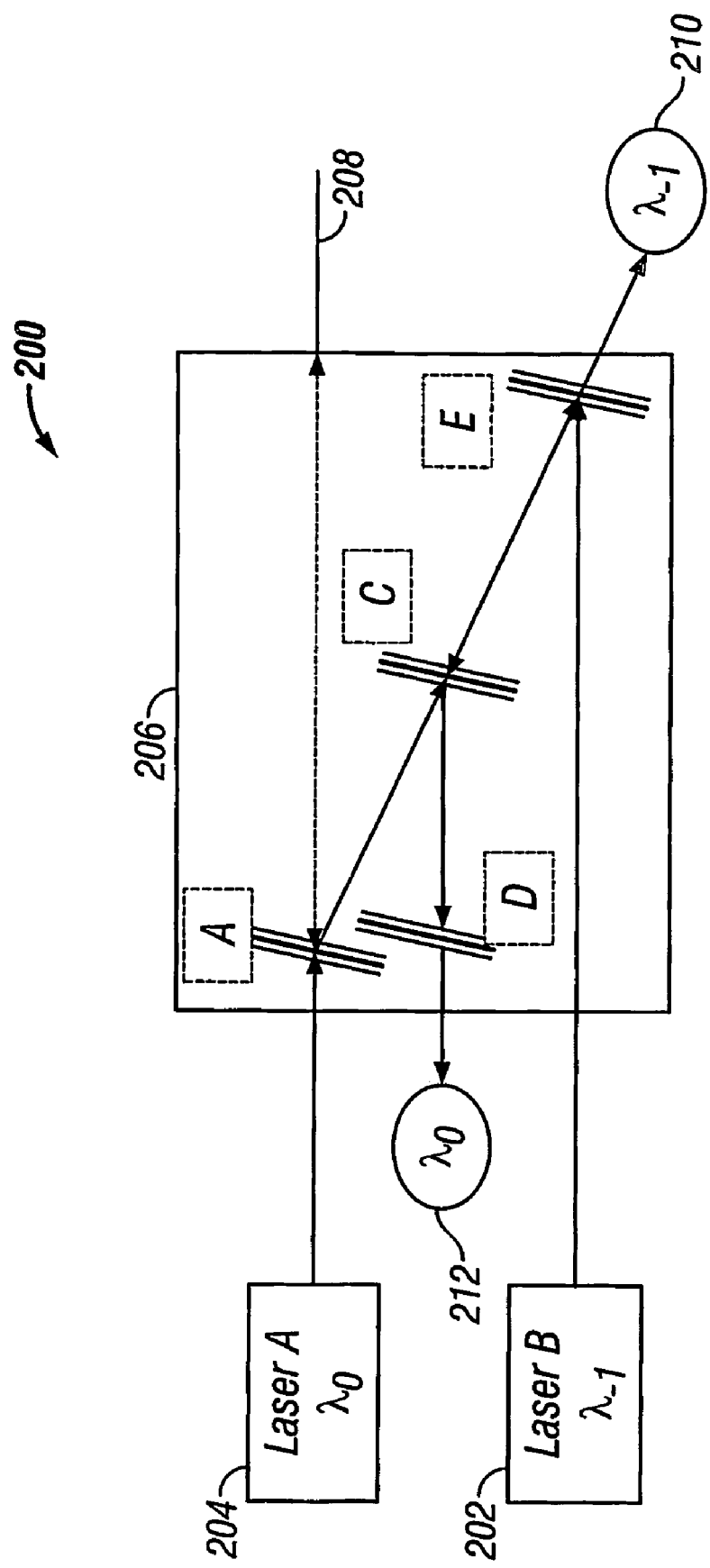
FIG. 5 shows a schematic representation of a second example of apparatus according to a second embodiment of the present invention.

FIG. 5 shows an alternative example of an optical block 206. Once again, the apparatus 200 comprises first and second optical sources 202, 204, a sensing fibre 208 and two detectors 210, 212 coupled to the optical block 206. The optical block 206 contains four angled dichroic beam splitters A, C, D and E. The second optical source 204, the sensing fibre 208, the λ0 detector 212 and the beamsplitters A, C and D are arranged as in FIG. 4, with the beamsplitters having the same reflectivities as before. The example of FIG. 5 differs from this by the replacement of beamsplitter B with a beamsplitter E having different reflectivity characteristics (see Table 1) and positioned between beamsplitter C and the $\lambda_{-1}$ detector 210. As with the beamsplitter B in FIG. 4, beamsplitter E acts as an input beamsplitter for light from the first optical source 202.

In operation, light at $\lambda_0$ leaves the second optical source 204, passes through the beamsplitter A and is coupled straight into the fibre 208. Light at this wavelength leaving the fibre 208 reaches its detector by being reflected from beamsplitter A to beamsplitter C, and from there to beamsplitter D, where it is transmitted and filtered before reaching the detector 212. Light at $\lambda_{-1}$, on the other hand, is generated by the first optical source 202, and follows a folded path via reflection from beamsplitter E, transmission through beamsplitter C and reflection from beamsplitter A to become coincident with the incoming light at $\lambda_0$ from the second optical source 204 for coupling into the fibre 206. Backscattered light at $\lambda_{-1}$ follows this path in reverse, except that it is transmitted at beamsplitter E to reach the $\lambda_{-1}$ detector 210.

Compared to the first example of this embodiment, the FIG. 5 example results in greater transmission losses for the light at $\lambda_{-1}$ on its outward journey, from the first optical source 202 to the fibre 206, but provides greater filtering of Rayleigh backscatter at $\lambda_0$ from the returning signal at $\lambda_{-1}$.

Figure 6:
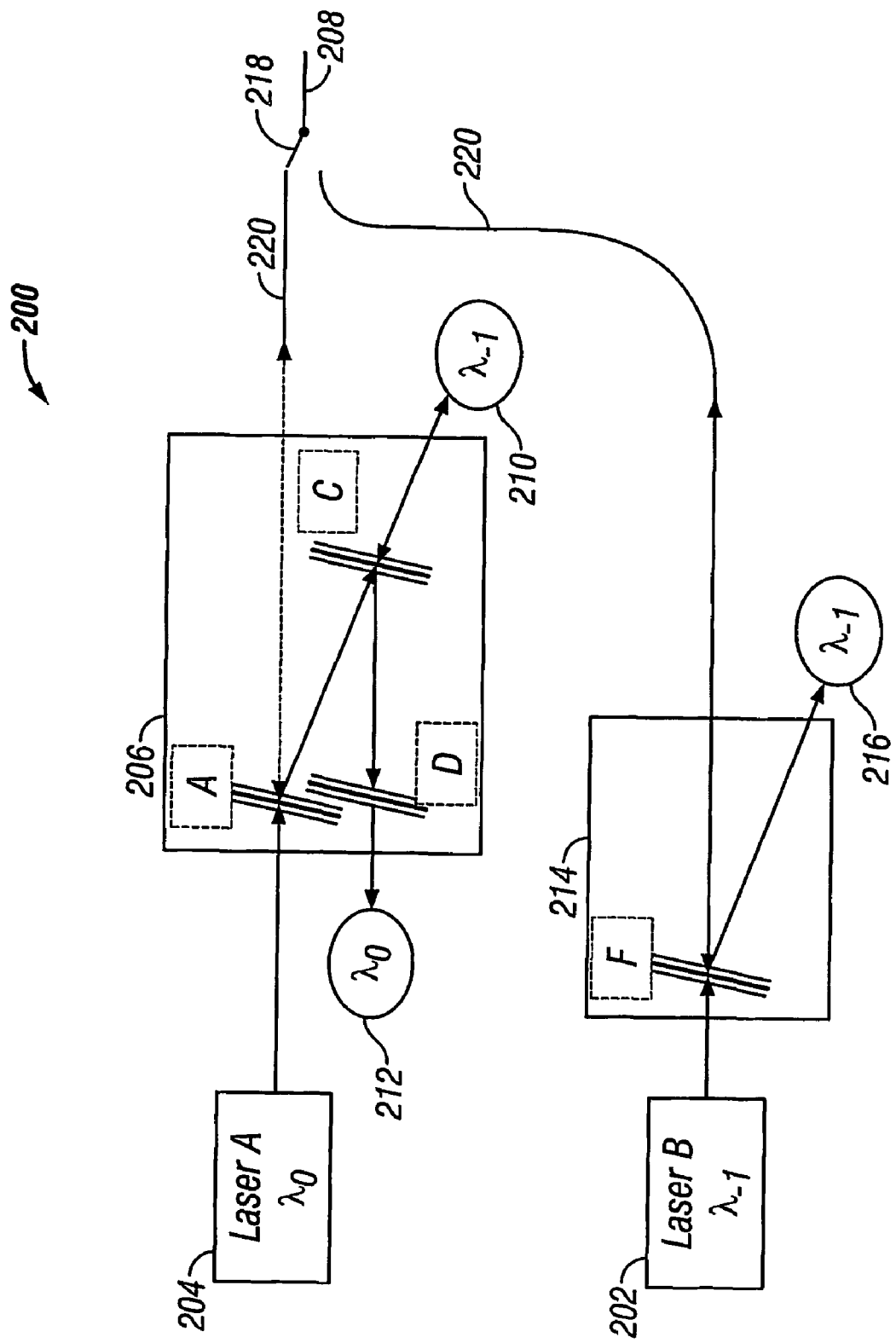
FIG. 6 shows a schematic representation of a third example of apparatus according to a third second embodiment of the present invention.

FIG. 6 shows a third example of a block optic coupling arrangement. In this case, the two optical sources, and the output signals to which they give rise, are separated. The second optical source generating $\lambda_0$, the sensing fibre 208, the $\lambda_0$ detector 212 and the $\lambda_{-1}$ detector 210 are arranged as before around the optical block 206, which again comprises the beamsplitters A, C and D. No fourth beamsplitter is included, however, and the optical block 206 does not receive an input at $\lambda_{-1}$ from the first optical source 202. This part of the apparatus is therefore operable for generation and coupling into the fibre 208 of the first and third optical signals at $\lambda_0$, and the detection of the resulting high and low power Rayleigh scattered light at $\lambda_0$ and Raman scattered light at $\lambda_{-1}$.

A second optical block 214 is provided in conjunction with the first optical source 202, and comprises a further beamsplitter F with characteristics as shown in Table 1, and has an associated detector 216 operable to detect light at $\lambda_{-1}$. Light generated by the first optical source 202 enters the second optical block 214, and is transmitted through the beamsplitter F and directed to the optical fibre 206. Returning backscattered light at this wavelength enters the optical block 214 and is reflected from the beam splitter F to the second A, detector 216. Thus, this part of the apparatus is operable to generate the second optical signal, at $\lambda_{-1}$ and to detect the resulting Rayleigh backscattered light also at $\lambda_{-1}$.

To enable coupling of the inputs from the two optical blocks into the fibre 208, and directing of the backscattered light to the relevant optical blocks, the apparatus is further provided with an optical fibre switch 218 arranged at the proximal end of the fibre 208. Each of the optical blocks 206, 214 is provided with an input-output fibre 220 connected to the switch to carry light between the optical block and the fibre 208. Thus, the sensing fibre 208 can be connected to one or other of the optical blocks 206, 214 and their related optical sources 204, 202 and detectors 210, 212, 216 as required, by appropriate positioning of the switch 218. The switch 218 and the optical sources 202, 204 can all be under control of the processor 32 (not shown) so that the fibre 208 can be correctly coupled to receive the various optical signals.

An advantage of this arrangement is that separate detectors for the two $\lambda_{-1}$ output signals are provided, which can then be individually optimised for performance characteristics such as sensitivity. The switch may also be provided in conjunction with a fused fibre coupler arrangement similar to those of FIGS. 1, 2 and 3.

TABLE 1

| | Dichroic | | | | | |
|---|---|---|---|---|---|---|
| | A | B | C | D | E | F |
| Transmission @ $\lambda_0$ | 80% | 100% | ~0% | >90% | ~0% | Don't care |
| Reflection @ $\lambda_0$ | 20% | 0% | >99% | <1% | 100% | Don't care |
| Transmission @ $\lambda_{-1}$ | 0% | 85% | >90% | ~0% | 85% | 50% |
| Reflection @ $\lambda_{-1}$ | 100% | 15% | <1% | 100% | 15% | 50% |

THIRD EMBODIMENT

The purpose of the third output signal, being the Rayleigh signal at $\lambda_{-1}$, is to normalise the losses suffered by the first output signal, which is the Raman signal at $\lambda_{-1}$. However, these two signals originate from different sources, namely the Raman scattering event in the case of the first output signal, and the second optical source 18 in the case of the third output signal. The spectrum of the Raman scattering is typically broad, so that it may exceed the spectral bandwidth of the second optical source 18. In some cases the Raman spectrum may exceed that of any available optical source operating at the appropriate wavelength. The attenuation seen by the two signals is therefore likely to be different.

Therefore, to improve the accuracy of the normalisation, according to a third embodiment of the invention, the spectrum of the second optical source 18 is matched to the Raman spectrum. A spectral modifier may be provided to achieve this, which may be implemented in several ways.

A first example modifies the apparatus 10 shown in any of FIGS. 1 to 3 by providing a narrow band filter to filter the Raman light, and hence decrease the spectral bandwidth to match that of the second optical source 18.

Figure 7:
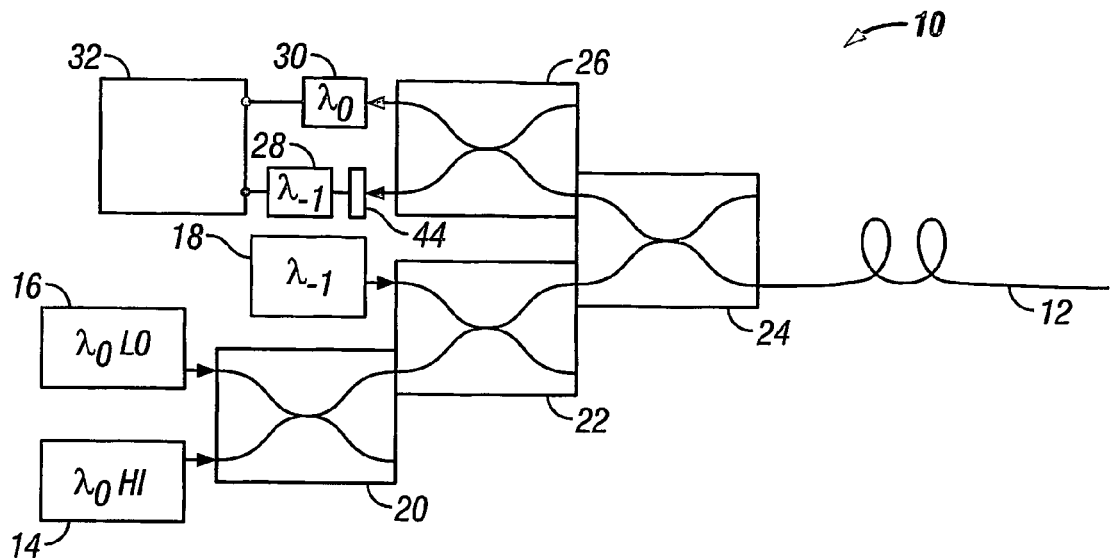
FIG. 7 shows a schematic representation of a first example of apparatus according to a third embodiment of the present invention.

FIG. 7 shows the apparatus 10 including such a filter. The filter 44 is arranged between the output coupler 26 and the first detector 28 which detects light at $\lambda_{-1}$. Therefore, the anti-Stokes Raman light passes through the filter 44 before being detected The Rayleigh scattered light at $\lambda_{-1}$ also passes through the filter 44, but will either be unaffected if its bandwidth is narrower than that of the filter 44, or will be trimmed slightly by the filter 44. In either case, the spectra of the Raman light is brought more closely into line with that of the Rayleigh light.

A second example takes an opposite approach, and broadens the spectrum of the output of the second source 18, so that the subsequent Rayleigh light at $\lambda_{-1}$ will have a spectrum more closely matched to the broad Raman light. One way of achieving this is to rapidly vary the central wavelength $\lambda_{-1}$ of the output of the second optical source 18 over a small range $\Delta_{-1}$, so that the time-averaged spectrum of the output is broader than it would naturally be, and hence closer to the Raman light. The tuning may be performed by any suitable method, such as temperature tuning or angle tuning of an intracavity spectrally selective component.

Figure 8:
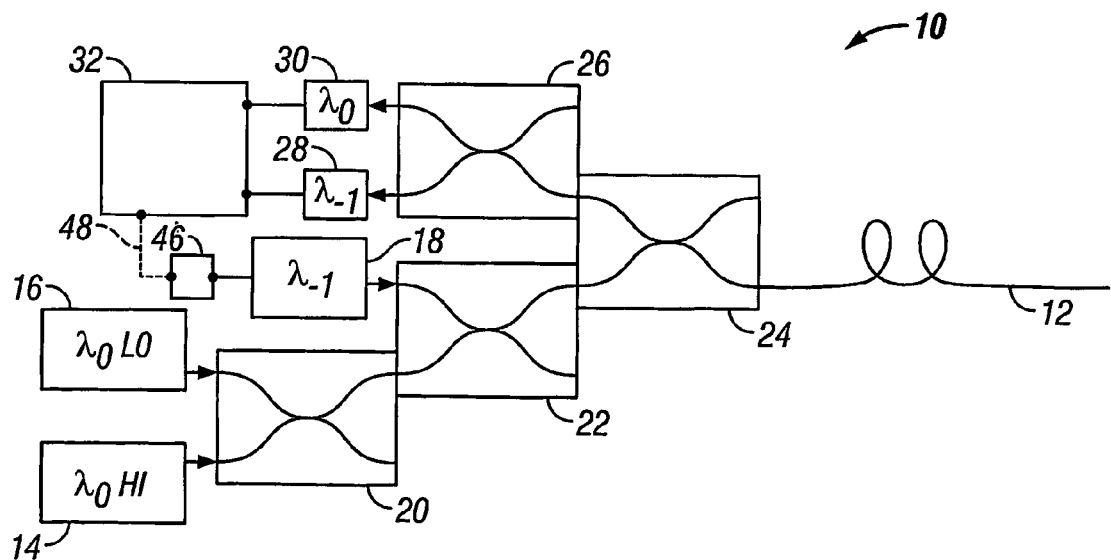
FIG. 8 shows a schematic representation of a second example of apparatus according to a third embodiment of the present invention.

FIG. 8 shows the apparatus 10 modified in accordance with this example. A spectral broadening device 46 operable to rapidly vary the output wavelength of the second optical source 18 is provided for the second optical source 18. The spectral broadening device 46 may tune the output wavelength by any suitable technique, such as heating and cooling of the source 18 or parts thereof to utilise temperature tuning, or rotation of an active medium in the source 18 to achieve angle tuning. The most appropriate approach will depend on the nature of the source 18. In the case of a laser, the wavelength of which is controlled by a fibre Bragg grating, this may be achieved by either temperature tuning or strain tuning. The spectral broadening device may be operated independently, or it may be configured to be under control of the processor 32, as indicated in FIG. 8 by the control line 48 shown in phantom.

Alternatively, the wavelength tuning and the filtering techniques may be used in combination to make the Raman and Rayleigh backscatter spectra at $\lambda_{-1}$ as similar as possible.

FOURTH EMBODIMENT

The invention may be implemented using single mode or multimode fibre. Multimode fibres can introduce particular issues relating to propagation loss. The various optical signals may propagate through the fibre with different modal structures, and the loss for these may be different because losses tend to differ between groups of modes. Over time, the power distribution amongst the various modes supported by the fibre can change, so that differential loss between the signals is altered. This can occur by bends being introduced or splices being misaligned if the fibre is disturbed. One specific problem is that the attenuation for a forward propagation direction may differ from the attenuation through the same section of fibre for the reverse propagation direction.

To address these issues, it is therefore proposed to use a mode filter [4]. Any variations in modal power distribution occurring in the fibre tend to be most pronounced in higher order modes, so removal of these modes with a mode filter reduces differential loss in the measured signals. The unwanted effects of modal power distribution are thus mitigated. The mode filter can be implemented by providing a second section of fibre through which the backscattered signals are transmitted, and which has a smaller core diameter and a smaller numerical aperture than the main sensor fibre 12. The higher order modes cannot be coupled from the larger fibre to the smaller fibre, and are therefore removed. For example, the sensor fibre may have a core diameter of 62.5 μm and a numerical aperture of 0.27, and the mode filter fibre may have a core diameter of 50 μm and a numerical aperture of 0.2.

Figure 9:
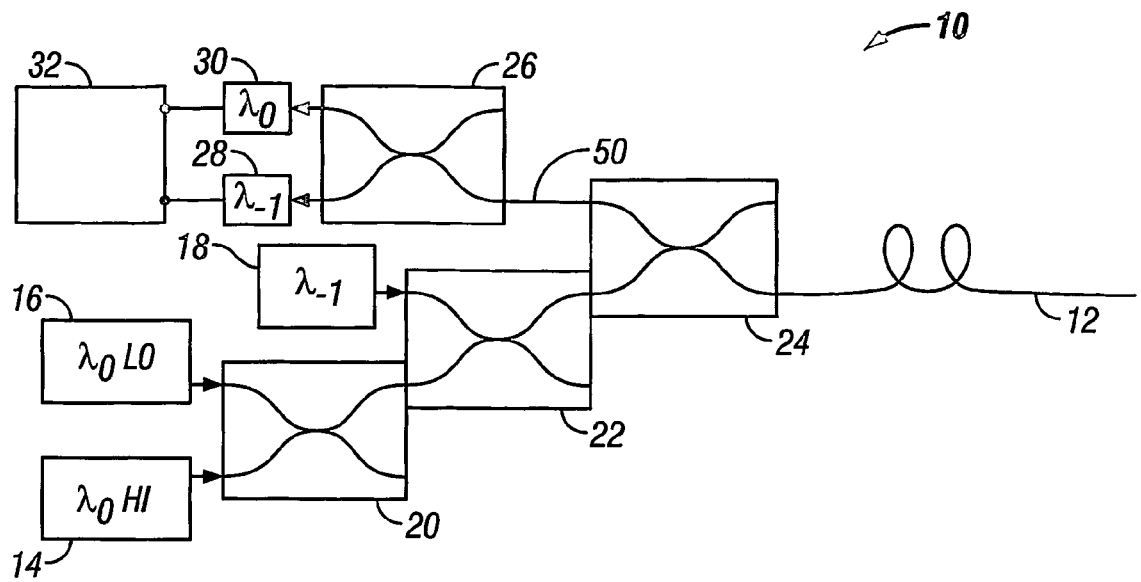
FIG. 9 shows a schematic representation of apparatus according to a fourth embodiment of the present invention.

FIG. 9 shows a schematic depiction of the apparatus 10 comprising a fibre mode filter of this type. A section of optical fibre 50 having suitable core diameter and numerical aperture properties is arranged to receive the backscattered light as it leaves the input/output coupler 24, and transmit the light to the output coupler 26. Thus the higher order modes are removed before the backscattered light is received by the detectors 28, 30. Other arrangements may be implemented to achieve the same effect. For example, lengths of "small" fibre can be arranged immediately before each detector, or the relevant paths through the output coupler 26 can be configured to have the same optical characteristics as the "small" fibre so the filtering and coupling requirements can be provided by a single component. Alternatively, a length of "small" fibre can be positioned directly in line with the sensing fibre 12, between the input/output coupler 24 and the proximal end of the fibre 12. In this position, the higher order modes are removed from the backscattered light as it is emitted from the sensing fibre 12, whereas the incoming optical signals from the various optical sources 14, 16, 18 will pass unaffected through the filter fibre and into the sensing fibre 12 because the outputs from typical laser sources suitable for use as the optical sources 14, 16, 18 usually occupy only low order modes in an optical fibre. This arrangement can also be used in conjunction with the embodiments of FIGS. 4 to 6.

One or more bulk optic mode filters can optionally be used instead of a fibre mode filter. These comprise spatial filters (apertures) placed in the beam path of the output signals to be filtered that restrict the numerical aperture of the system and hence remove the higher order modes. Bulk optic filters may be conveniently implemented in systems having bulk optic coupling as described with reference to FIGS. 4, 5 and 6, by including the apertures in the optical block or blocks containing the bulk coupling devices. However, a fibre mode filter may be generally preferred because it can be spliced into position within the system and hence will stay properly aligned.

FIFTH EMBODIMENT

It is also advantageous to take account of the fact that the Raman and Rayleigh scattering processes may have different loss and scattering cross-section properties, even for the same wavelength of light. This can introduce a further differential loss between the various signals of interest. The relation between Raman and Rayleigh scattering has some dependence on the optical material in which the scattering occurs.

The most common material from which optical fibres are fabricated is silica, which is commonly doped with various materials to alter the optical properties, such as refractive index. The core of an optical fibre has a higher refractive index than the cladding, to give the waveguiding properties, and this is commonly achieved by selective doping of the core region. Germanium is a common dopant. Fortuitously for the issue of Raman and Rayleigh scattering, the relation between the two is well-behaved in germanium-doped silica. The scattering loss is found to increase in roughly the same proportion as the Raman scattering cross-section. For example, the Raman scattering cross-section for germania is about ten times that of silica in the 440 cm$^{-1}$ Raman band. Thus by adding 10 m % germania to the silica in the core of a fibre, the Raman scattering in the core is expected to double. The Rayleigh scattering coefficient is also roughly linear with germania doping concentration, again doubling for a 10 m % level. Thus, the Raman and Rayleigh scattering properties are well-matched, so that germano-silica glass fibre allows the Raman signal to be well-referenced to the Rayleigh signal, so that the normalisation process is accurate.

Therefore, it is preferred that the present invention be implemented using germanium-doped silica for the core of the optical fibre 12. Preferably, no other dopants are present, because some will have adverse effects on the Raman-Rayleigh relationship. For example, phosphorus reduces the Rayleigh scattering and has a Raman spectrum that differs from that of silica.

SIXTH EMBODIMENT

The embodiments presented thus far have used separate optical sources for generating the two wavelengths $\lambda_0$ and $\lambda_{-1}$. This assumes that reliable sources having sufficient power outputs are with outputs appropriately spaced in wavelength. This may not always be readily achievable, especially when the additional constraints of the transmission bandwidth and Raman spectrum of the sensing fibre and the sensitivities of available detectors are taken into account.

A further embodiment of the present invention addressed this issue by using a single optical source to generate both output wavelengths. This can be achieved by choosing an optical source to generate the shorter wavelength, $\lambda_{-1}$, directly, and obtaining the longer wavelength $\lambda_0$ by Raman shifting some of the light at $\lambda_{-1}$ in an optical fibre having a Raman spectrum that matches the Raman spectrum of the sensing fibre, thus giving the correct wavelength spacing. To obtain a sufficient power at the longer wavelength, a power level at $\lambda_{-1}$ exceeding the threshold for stimulated Raman scattering should be injected into the Raman fibre, to ensure that stimulated scattering occurs. To achieve this, a fibre amplifier with an associated optical pump source can be arranged before the Raman fibre to boost the $\lambda_{-1}$ input.

Figure 10:
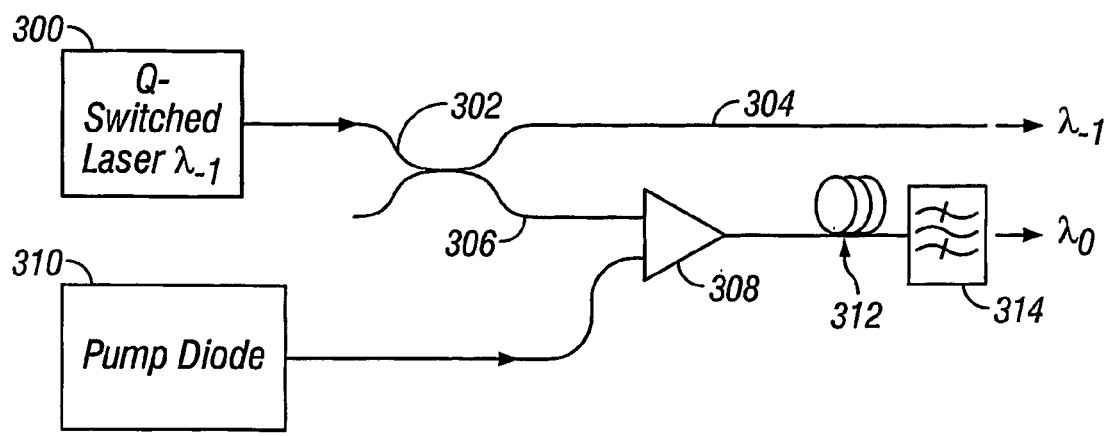
FIG. 10 shows a schematic representation of an optical source comprising part of apparatus according to a sixth embodiment of the present invention.

FIG. 10 shows a schematic representation of apparatus suitable for performing the Raman shifting. An optical source, such as a Q-switched laser, operable to generate light at $\lambda_{-1}$ is provided. The output of this is coupled into a fused fibre coupler 302 which divides the light between its two output ports. Light from one output port forms the optical signal at $\lambda_{-1}$. Light from the other output port may be passed through an optical fibre amplifier 308, such as a neodymium or erbium doped fibre amplifier, to increase its power level. The fibre amplifier 308 has an associated optical pump source 310 to provide optical gain in the amplifier at $\lambda_{-1}$, which may typically be a diode laser. The amplified $\lambda_{-1}$ signal then passes into a length of Raman shifting fibre 312, in which it undergoes stimulated Raman shifting to at least its first Stokes band, at $\lambda_0$. Further shifting to still longer wavelengths at higher order Stokes bands will also typically occur. Therefore, to provide a clean signal at $\lambda_0$, the output from the Raman shifting fibre (in the forward direction) is passed through a bandpass filter to remove any residual power at $\lambda_{-1}$ and any high order Stokes light.

To obtain the two different power levels needed at $\lambda_0$, the power of the light generated by the Raman shifting fibre should be modifiable. This may be achieved for example by providing a variable attenuator to attenuate the light either before or after the Raman shifting fibre, or by adjusting the power output of the pump source 310 to increase or decrease the gain offered by the optical amplifier 308. Alternatively, the output of the optical source that generates light at $\lambda_{-1}$ may be split into three, so that two separate Raman shifting fibres can be used, one to generate each of the required optical signals at $\lambda_0$.

There is also scope for obtaining optical signals at $\lambda_0$ and $\lambda_{-1}$ with the required wavelength spacing by nonlinear optical frequency conversion (optical parametric generation, or sum or difference frequency mixing) of the output from one or more optical pump sources.

SEVENTH EMBODIMENT

Optical fibres are commonly used as sensors in the oil industry, because they are suitably robust to withstand the rigours of the downhole environment. The present invention may be utilised for sensing within an oil well, for example as a temperature sensor. Temperature profiles of oil wells are commonly recorded, because the information obtained yields useful details about the operation of the well.

To utilise a sensor according to the present invention in this way, it must be deployed within an oil well. Typically, the fibre will be required to extend from the surface down into the depths of the well, with the associated instrumentation and equipment at the surface end of the fibre, because the far end of the fibre is remote and inaccessible. Thus single-ended measurement techniques must be relied upon, such as that of the present invention. Further, the distributed aspect of the embodiments of the invention allows the full depth of a well to be monitored with a single fibre if necessary. The fibre can be deployed downhole and maintained in place over the long term to allow continuous monitoring, or can be arranged for short term deployment as and when required. A suitable technique for installing the fibre is to use high pressure fluid to pump it into a closed hydraulic system extending from the surface down into the well bore [5].

Therefore, an embodiment of the present invention comprises apparatus suitable for implementing the method of the present invention together with fibre deployment mechanism operable to deploy the fibre down into a wellbore of an oil well.

Figure 11:
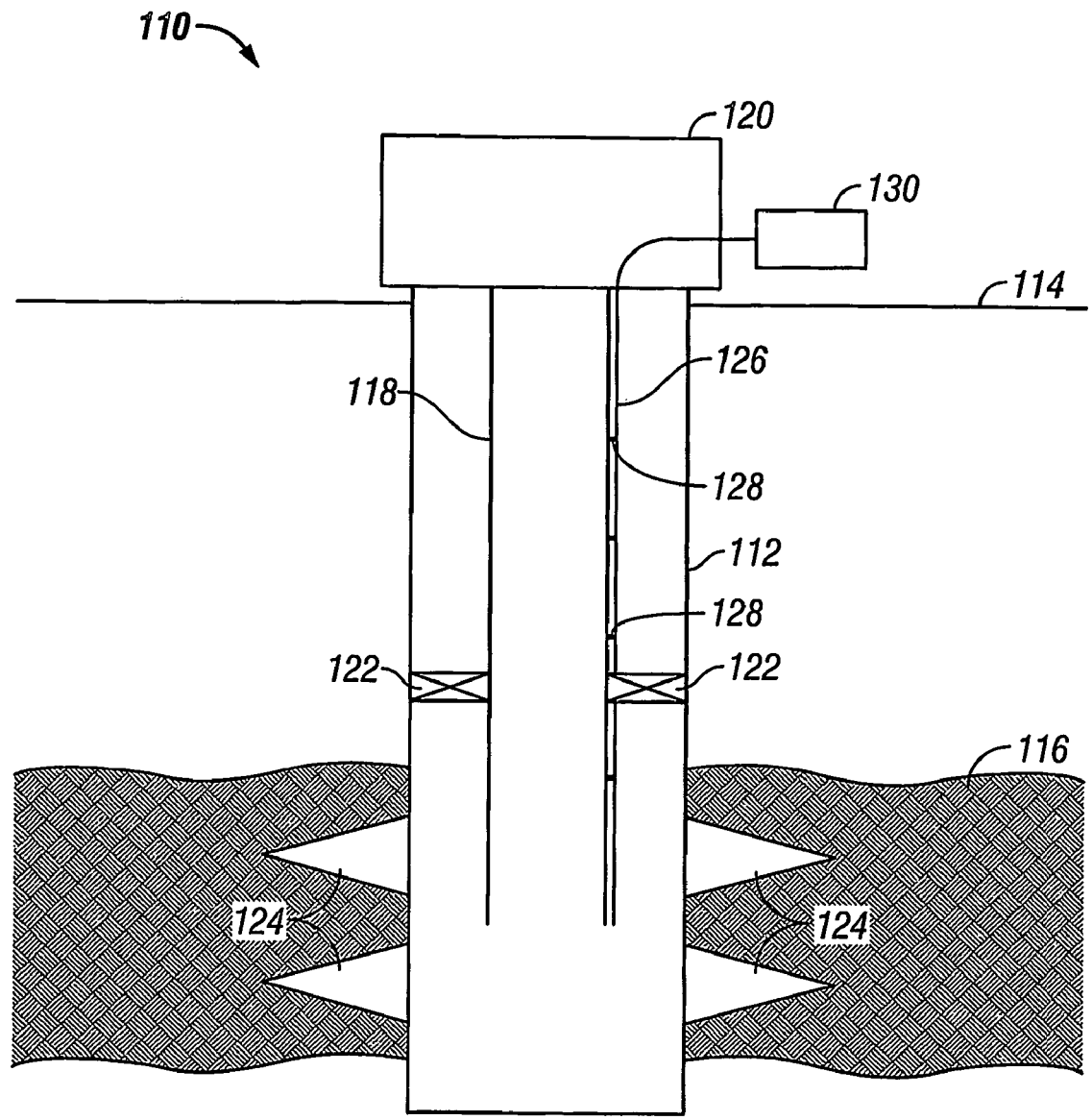
FIG. 11 shows a schematic representation of apparatus according to a seventh embodiment of the present invention, deployed for use within an oil well.

FIG. 11 shows a simplified schematic vertical cross-sectional view of an oil well, illustrating some basic features. The oil well, or well bore 110 comprises an outer casing 112 sunk into the ground 114, and penetrating through a hydrocarbon reservoir 116, the contents of which are to be extracted using the well 110. Disposed with the casing 112 is a production tubing 118, which is used to carry oil upwards from the reservoir 116 to the surface. The production tubing 118 is open at its lower end, and is held in place within the casing 112 by packing 122. A well head 120 is located at the top end of the production tubing 118. Equipment used to extract the oil, such as pumping equipment and controls for valves and the like (not shown) is also provided. Oil flows from the reservoir 116 into the casing 112 and then up the production tubing 118 by way of perforations 124 extending through side walls of the casing 112 and into the reservoir 116.

Also shown in FIG. 11 is an optical fibre installation for obtaining distributed measurements according to the present invention. An optical fibre is arranged within a protective fibre deployment tube 126. The deployment tube 126 runs through the well head 120 and down the length of the outer surface of the production tubing 118, and is attached thereto by a number of fasteners 128. The deployment tube 126 may alternatively be arranged on the inner surface of the production tubing 118, or on a surface of the outer casing 112. Alternatively, the fibre can be permanently installed by fastening it, or a housing containing it, directly to the tubing 118 or casing 112 as the well bore is constructed.

A control unit 130, connected to the upper end of the optical fibre installation, is provided outside the well bore 110. The control unit 130 contains equipment for operating the fibre sensor such as that shown in any of the preceding Figures, including appropriate optical sources, couplers and detectors, and also a deployment mechanism to feed the fibre into the deployment tube 126 and extract it therefrom, such as the above-mentioned hydraulic system.

FURTHER EMBODIMENTS

The preceding description has been based on the detection of Raman scattered light in the anti-Stokes band for the measurement of temperature. However, the various embodiments can be adapted for the measurement of other parameters, including pressure and strain, and the detection of other backscattered light. For example, fluid flow past the fibre may be monitored by way of temperature measurements, by relying on the cooling effect of the moving fluid on the fibre. Also, Brillouin scattering may be monitored instead of or as well as Raman scattering and/or Rayleigh scattering. Brillouin scattering is an inelastic scattering process which, like Raman scattering, gives a spectral peak on each side of the central wavelength of the launched pulse that vary with some external factors, that can thereby be measured or monitored. The Brillouin peaks are narrower and closer to the central wavelength than Raman peaks.

The coupling of the light between the optical sources, the sensing fibre and the detectors has been described with reference to examples utilising fused fibre couplers for single mode fibre configurations and bulk optic dichroic beamsplitters for multimode fibre configurations. However, the invention is not limited thereto; any suitable optical devices can be used which achieve the desired result, using both alternative bulk optic devices such as mirrors or gratings, and fibre devices such as Bragg gratings and optical circulators.

Also, any of the various features of the preceding embodiments, examples and implementation may be combined in combinations other than those specifically described without departing from the scope of the appended claims.

REFERENCES

[1] GB 2,140,554
[2] EP 0,213,872
[3] US 5,592,282
[4] A R Michelson and M Eriksrud, "Theory of the backscattering process in multimode optical fibres", *Appl. Opt.* 21(11), pp 1898-1909, 1982
[5] US RE37,283 E

The invention claimed is:

1. A method of using an optical fibre to obtain a distributed measurement of a parameter of interest, comprising:
    deploying an optical fibre in a measurement region of interest;
    launching a first optical signal at a first wavelength $\lambda_0$ and a first optical power level into the optical fibre;
    detecting backscattered light emitted from the optical fibre at a second wavelength $\lambda_{-1}$ arising from inelastic scattering of the first optical signal, and generating a first output signal therefrom, the first output signal being indicative of the parameter of interest;
    detecting backscattered light emitted from the optical fibre at the first wavelength $\lambda_0$ arising from elastic scattering of the first optical signal, and generating a second output signal therefrom;
    launching a second optical signal at the second wavelength $\lambda_{-1}$ into the optical fibre;
    detecting backscattered light emitted from the optical fibre at the second wavelength $\lambda_{-1}$ arising from elastic scattering of the second optical signal, and generating a third output signal therefrom;
    launching a third optical signal at the first wavelength $\lambda_0$ and a second optical power level less than the first optical power level into the optical fibre;
    detecting backscattered light emitted from the optical fibre at the first wavelength $\lambda_0$ arising from elastic scattering of the third optical signal, and generating a fourth output signal therefrom;
    generating a synthetic output signal from the second output signal and the fourth output signal; and
    generating a final output signal indicative of the parameter of interest by normalising the first output signal to the geometric mean of the synthetic output signal and the third output signal.

2. A method according to claim 1, in which the second optical power level is selected to be below a threshold for nonlinear optical interactions of light at the first wavelength $\lambda_0$ propagating in the optical fibre.

3. A method according to claim 1 or claim 2, in which the synthetic output signal is generated by normalising the square of the second output signal to the fourth output signal.

4. A method according to claim 1, in which the inelastic scattering is Raman scattering and the second wavelength $\lambda_{-1}$ is an anti-Stokes band of the first wavelength $\lambda_0$.

5. A method according to claim 4, in which the parameter of interest is temperature.

6. A method according to claim 1, and further comprising matching spectral features of the inelastically backscattered light at the second wavelength $\lambda_{-1}$ to spectral features of the second optical signal.

7. A method according to claim 6, in which the inelastically backscattered light at the second wavelength $\lambda_{-1}$ is spectrally filtered before the first output signal is generated.

8. A method according to claim 6 or claim 7, in which the second optical signal is spectrally broadened before it is launched into the optical fibre.

9. A method according to claim 1, in which the method further comprises passing the backscattered light emitted from the optical fibre through a mode filter to remove higher order modes.

10. A method according to claim 9, in which the optical fibre has a first core diameter and a first numerical aperture, and the mode filter comprises an optical fibre having a second core diameter smaller than the first core diameter and a second numerical aperture smaller than the first numerical aperture.

11. A method according to claim 9, in which the mode filter comprises a spatial filter ranged to attenuate the higher order modes.

12. A method according to claim 1, in which the optical fibre has a core region comprising silica doped with germanium.

13. A method according to claim 12, in which the optical fibre has a core region comprising silica doped only with germanium.

14. A method according to claim 1, in which the optical fibre is deployed within a well bore of an oil well.

15. A method according to claim 1, and further comprising generating one or both of the first optical signal and the third optical signal by taking an optical signal at the second wavelength $\lambda_{-1}$ from an optical source operable to generate the second optical signal, and passing the optical signal at the second wavelength $\lambda_{-1}$ through a Raman shifting optical fibre so as to generate light at the first wavelength $\lambda_0$ by the process of stimulated Raman scattering within the Raman shifting optical fibre.

16. Apparatus for obtaining a distributed measurement of a parameter of interest, comprising:
   an optical fibre for deployment in a measurement region of interest;
   one or more optical sources operable to generate and launch into the optical fibre:
      a first optical signal at a first wavelength $\lambda_0$ and a first optical power level;
      a second optical signal at a second wavelength $\lambda_{-1}$; and
      a third optical signal at the first wavelength $\lambda_0$ and a second optical power level less than the first optical power level; and
   one or more detectors operable to:
      detect backscattered light emitted from the optical fibre at the second wavelength $\lambda_{-1}$ arising from inelastic scattering of the first optical signal, and to generate a first output signal therefrom, the first output signal being indicative of the parameter of interest;
      detect backscattered light emitted from the optical fibre at the first wavelength $\lambda_0$ arising from elastic scattering of the first optical signal, and to generate a second output signal therefrom;
      detect backscattered light emitted from the optical fibre at the second wavelength $\lambda_{-1}$ arising from elastic scattering of the second optical signal, and to generate a third output signal therefrom; and
      detect backscattered light emitted from the optical fibre at the first wavelength $\lambda_0$ arising from elastic scattering of the third optical signal, and to generate a fourth output signal therefrom; and
   a signal processor operable to generate a synthetic output signal from the second output signal and the fourth output signal and to generate a final output signal indicative of the parameter of interest by normalising the first output signal to the geometric mean of the synthetic output signal and the third output signal.

17. Apparatus according to claim 16, in which the one or more optical sources comprises a single optical source operable to generate the first optical signal and the third optical signal, the single optical source comprising a power control operable to alter the optical power level of an optical signal generated by the single optical source between the first optical power level and the second optical power level.

18. Apparatus according to claim 16 or claim 17, in which the one or more optical sources comprises an optical source operable to generate the second optical signal, and one or more Raman shifting optical fibres arranged to receive an optical signal at the second wavelength $\lambda_{-1}$ from the optical source operable to generate the second optical signal and to generate the first optical signal and the third optical signal by the process of stimulated Raman scattering within the Raman shifting optical fibre.

19. Apparatus according to claim 16 or claim 17, in which the second optical power level is selected to be below a threshold for nonlinear optical interactions of light at the first wavelength $\lambda_0$ propagating in the optical fibre.

20. Apparatus according to claim 16 or claim 17, in which the processor is operable to generate the synthetic output signal by normalising the square of the second output signal to the fourth output signal.

21. Apparatus according to claim 16 or claim 17, in which the inelastic scattering is Raman scattering and the second wavelength $\lambda_{-1}$ is an anti-Stokes band of the first wavelength $\lambda_0$.

22. Apparatus according to claim 21, in which the parameter of interest is temperature.

23. Apparatus according to claim 16 or claim 17, and further comprising a spectral modifier operable to march spectral features of the inelastically backscattered light at the second wavelength $\lambda_{-1}$ to spectral features of the second optical signal.

24. Apparatus according to claim 23, in which the spectral modifier comprises one or more spectral filters through which the inelastically scattered light at the second wavelength $\lambda_{-1}$ is passed before the first output signal is generated.

25. Apparatus according to claim 23, in which the spectral modifier comprises a spectral broadening arrangement operable to spectrally broaden the second optical signal before it is launched into the optical fibre.

26. Apparatus according to claim 16, in which the apparatus further comprises a mode filter operable to remove higher order modes from the backscattered light emitted from the optical fibre.

27. Apparatus according to claim 26, in which the optical fibre has a fast core diameter and a first numerical aperture, and the mode filter comprises an optical fibre arranged to receive the backscattered light emitted from the optical fibre and comprising an optical fibre having a second core diameter smaller than the first core diameter and a second numerical aperture smaller than the first numerical aperture.

28. Apparatus according to claim 26, in which the mode filter comprises a spatial filter arranged to attenuate the higher order modes.

29. Apparatus according to claim 16, in which the optical fibre has a core region comprising silica doped with germanium.

30. Apparatus according to claim 29, in which the optical fibre has a core region comprising silica doped only with germanium.

31. Apparatus according to claim 16, in which the optical fibre is for deployment within a well bore of an oil well.

32. Apparatus according to claim 31, and further comprising a fibre deployment mechanism operable to deploy the optical fibre into the well bore.

33. Apparatus according to claim 16, and further comprising a switch switchable between:

a first configuration in which the switch connects the optical fibre to the one or more optical sources so that the first optical signal and the third optical signal are launched into the optical fibre, and to the one or more detectors so that the one or more detectors detect backscattered light arising from inelastic scattering of the first optical signal, backscattered light arising from elastic scattering of the first optical signal, and backscattered light arising from elastic scattering of the third optical signal; and a second configuration in which the switch connects the optical fibre to the one or more optical sources so that the second optical signal is launched into the optical fibre, and to the one or more detectors so that the one or more detectors detect backscattered light ad sing from elastic scattering of the second optical signal.

* * * * *